(12) United States Patent
Grima

(10) Patent No.: US 8,424,437 B2
(45) Date of Patent: Apr. 23, 2013

(54) WHEEL FOR TRIGGERING MINES BY PRESSURE

(75) Inventor: Michel Grima, Chalonnes sur Loire (FR)

(73) Assignee: Etat Francais Represente par le Delegue General pour l'Armement, Arcueil (FR)

( * ) Notice: Subject to any disclaimer, the term of this patent is extended or adjusted under 35 U.S.C. 154(b) by 153 days.

(21) Appl. No.: 12/994,610

(22) PCT Filed: Aug. 21, 2009

(86) PCT No.: PCT/FR2009/001021
§ 371 (c)(1),
(2), (4) Date: Nov. 24, 2010

(87) PCT Pub. No.: WO2010/023373
PCT Pub. Date: Mar. 4, 2010

(65) Prior Publication Data
US 2011/0067559 A1   Mar. 24, 2011

(30) Foreign Application Priority Data

Aug. 28, 2008  (FR) ...................................... 08 04734

(51) Int. Cl.
*F41H 11/18* (2011.01)
(52) U.S. Cl.
USPC ........................................... 89/1.13; 102/402
(58) Field of Classification Search ................... 89/1.13; 102/402, 403
See application file for complete search history.

(56) References Cited

U.S. PATENT DOCUMENTS

| 1,745,100 | A | * | 1/1930 | Johnston et al. | ............. 299/37.4 |
| 2008/0092725 | A1 | * | 4/2008 | Simula et al. | .................. 89/1.13 |

FOREIGN PATENT DOCUMENTS

| FR | 2 851 036 A | | 8/2004 | | |
| GB | 1 209 161 A | | 10/1970 | | |
| GB | 2 106 454 A | * | 4/1983 | | ..................... 89/1.13 |
| JP | A-06-026796 | | 2/1994 | | |
| WO | WO 93/15373 | * | 8/1993 | | ..................... 89/1.13 |

OTHER PUBLICATIONS

Feb. 28, 2011 Written Opinion of International Application No. PCT/FR2009/001021 (with translation).
International Search Report mailed Jan. 25, 2010 in International Application No. PCT/FR2009/001021 (with translation).

* cited by examiner

*Primary Examiner* — Stephen M Johnson
(74) *Attorney, Agent, or Firm* — Oliff & Berridge, PLC

(57) ABSTRACT

A device for triggering mines by pressure, including a chassis and at least one wheel having a central hub and including: at least one assembly that is movable in translation along a radius of the wheel and comprises a weight block at its peripheral radial end, a device suitable for driving the at least one movable assembly, as the wheel rotates in a determined direction with respect to the chassis, in the direction of the hub over a limited sector of the wheel that is less than $2\pi$ radians; wherein the device suitable for driving the at least one movable assembly in the direction of the hub are fixed with respect to the chassis, or in that the assembly that is movable in translation comprises a support that is fixed with respect to the chassis.

12 Claims, 6 Drawing Sheets

WHEEL FOR TRIGGERING MINES BY PRESSURE

This application is the U.S. National Phase of PCT/FR2009/001021, filed Aug. 21, 2009, which claims priority from French Patent Application No. 0804734, filed Aug. 28, 2008, the entire disclosure of which is incorporated herein by reference hereto.

BACKGROUND

The present invention relates to rolling devices exerting a pressure on the ground, intended to perform decoying of pressure mines more particularly when routes need to be cleared of mines.

The principle of mass-based decoying consists in applying sufficient loads to the ground to cause pressure mines that are placed on or buried in the ground to explode. It is nevertheless desirable to minimize the weight of the devices used for this purpose.

SUMMARY

Known devices are ballasted wheels, having a running tread that is solid or equipped with a tire, that are towed or pushed by a system. As it advances, the wheel exerts a pressure corresponding to the total weight of the device over a strip of terrain the same width as its running tread. The disadvantage of these devices is that the weight needed to exert the pressure that serves to trigger the mines can be high.

The object of the invention is to allow application to the ground of a load equivalent to that of a weighted wheel while decreasing the weight of the assemblage, thus yielding a mine decoying device that is more efficient for an equivalent mass, or less heavy for the same efficiency.

This is achieved by equipping a device for triggering mines by pressure, comprising a chassis suitable for transmitting a traction load or a thrust load and at least one wheel having a central hub suitable for ensuring displacement of the device over the ground, with:
- at least one assembly within the thickness of the wheel, comprising a weight block and movable in translation along a radial direction, the vertical radius below the hub being among the radial directions that can be taken by each at least one movable assembly, and
- means suitable for driving said at least one movable assembly, as the wheel rotates in a determined direction with respect to the chassis, in the direction of the hub over a limited sector, said sector ending below the level of the hub and preferably below said hub.

Said device is characterized either in that said means suitable for driving said at least one movable assembly in the direction of the hub are fixed with respect to the chassis, or in that said assembly that is movable in translation comprises a support that is fixed with respect to the chassis.

This device will advantageously comprise energy storage means suitable for storing energy when said at least one movable assembly is driven in the direction of the axle, and returning said energy when it is no longer being driven.

In a first embodiment, this device comprises at least one series of identical movable assemblies forming a complete ring that rotates with the wheel, and the common drive means for each movable assembly of the ring is constituted by a slide that is fixed with respect to the chassis and occupies a limited angular sector, and is suitable for coming into contact with a contact element of said at least one movable assembly over said limited sector between a first end and a second end, said latter end being closer to the hub than the first and being located in the vertical plane that passes through the axis of the wheel.

The energy storage means can advantageously be a spring that is already compressed when the weight block is in contact with the interior of the running tread. It is then further compressed when a roller integral with the weight block passes over a fixed slide whose profile approaches the hub while rotating in the rotation direction of the wheel before relaxing vertically below the axle as the roller comes off the cam.

Another embodiment refers to a wheel that can rotate about an axle, having a running tread suitable for applying a load onto the ground, characterized in that it comprises at least one movable assembly that remains vertical below the axis of the wheel, and the drive means of the roller rotates with the wheel. This drive means will advantageously be a cam fastened onto the inner circumference of the running tread, which reproduces a basic pattern in the form of a wedge whose tip is oriented toward the wheel rotation direction with a step followed by a portion of the inner circumference of the running tread, occupying an angular sector having a dimension comparable to the space occupied by the roller with respect to the wheel circumference.

BRIEF DESCRIPTION OF DRAWINGS

The operation of the invention can be better understood by referring to the description of various embodiments of a wheel for triggering pressure mines, and with reference to the attached Figures.

DETAILED DESCRIPTION OF EMBODIMENTS

Figure 1:
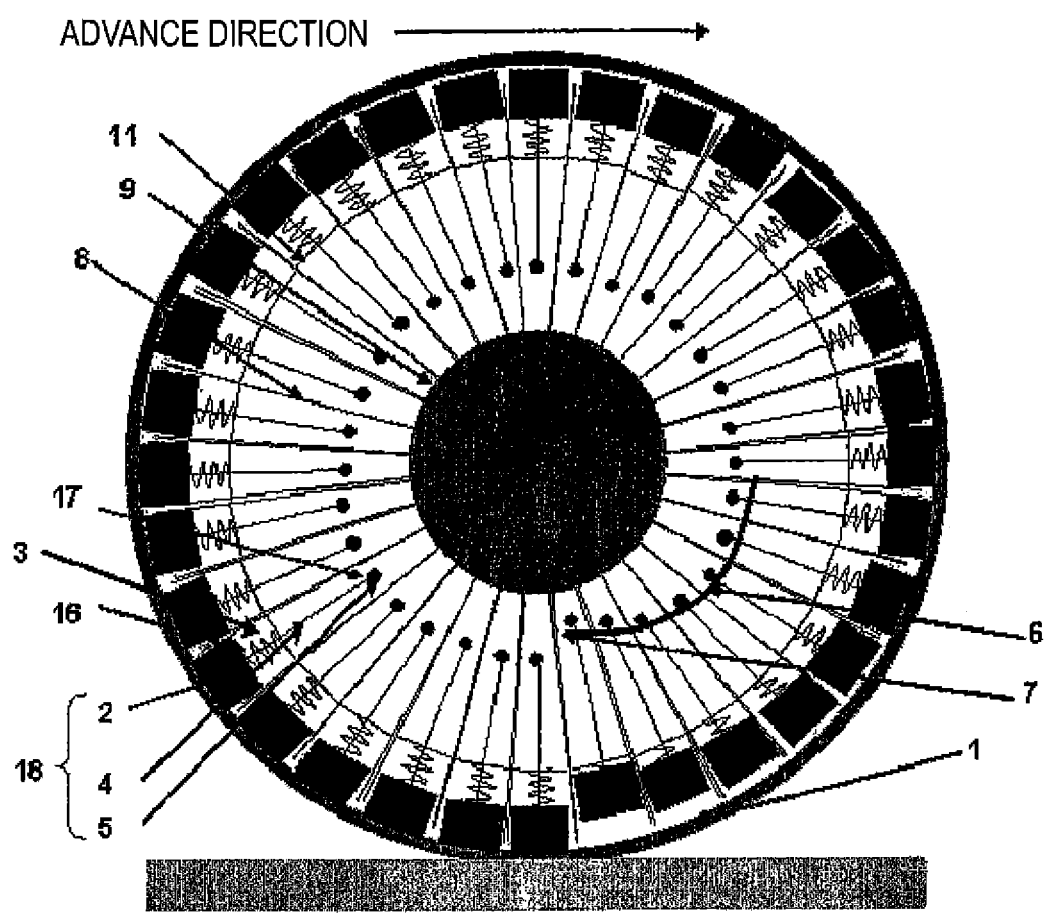
FIG. 1 shows the first embodiment, viewed along the hub axis, having movable assemblies integral with the movement of the wheel and the fixed slide that raises each weight block before releasing it as it passes vertically with respect to the point of contact with the ground.

FIG. 1 shows a wheel for pressure-triggering mines according to a first embodiment of the invention. This wheel is typically suitable for rotating about an axle 10 (not shown in the Figure) as the mine-clearing assembly of which it is a part advances in the selected direction. This wheel has a certain thickness in the axis of axle 10 that determines the width of the running tread and thus of the strip of terrain that will be processed as it advances.

This wheel comprises a central hub 9, an external ring 1 constituting a running tread, and connecting means 8 between hub 9 and running tread 1. These connecting means 8 are constituted by regularly distributed radii. A second ring 11 in the form of a circular strip closer to running tread 1 than to hub 9 is integral with connecting means 8. This second ring comprises at least one bore between two successive connecting means 8.

Each angular sector of the wheel encompassed between two successive connecting means 8 contains a movable assembly 18 comprising a weight block 2 connected to at least one rod 4 oriented along the radius of the wheel along which the movable assembly will translate. Each rod 4 is connected at its peripheral end 16 to weight block 2, and at its inner end 17 to a roller 5 that is free to rotate in accordance with an axis perpendicular to rod 4. Each rod 4 is free to translate along the radius, and passes through second ring 11 through a bore. The weight block occupies a maximum circumferential space between two successive connecting means, in order to optimize its weight and so it can move along the radius of rod 4 to which is fastened, between a peripheral stop position in which it touches the interior of running tread 1 and a position close to second ring 11. The length of rod 4 is thus adapted so that its inner end 17 is not in contact with the hub when the weight block is at the end of its travel toward inner ring 11.

In this embodiment, roller 5 is the element fastened on the rod, suitable for transmitting to the latter a force along its axis while being displaced on the surface of another object. The fact that the roller is free to rotate allows frictional forces during rotation on the surface to be minimized, but it is evident that any other device allowing displacement along said surface performs this function.

In addition, each movable assembly is associated with an elastic system 3 suitable for applying onto it a force toward the periphery that steadily increases as it approaches the axis of the wheel. This elastic system can advantageously be constituted by at least one spring, one of whose ends rests on inner ring 11 and the other on one of the surfaces of the weight block.

The totality of the movable assemblies forms a third ring occupying the totality of the circumference of the wheel. In the exemplifying embodiment of FIG. 1, the ring comprises 32 angular sectors having the same number of movable assemblies, but this number can be modified depending on the wheel dimensions and the correlation between the weight of the weight block, the stiffness of the elastic system, and the travel length of the movable assembly.

The device also comprises at least one slide 6 that is fixed with respect to the axle. The function of this slide is, as the wheel turns, to drive roller 5 located at end 17 of rods 4 from the position in which it is located when the movable assembly arrives against a peripheral stop horizontally in front of the axle, to the position that said roller 5 occupies as the movable assembly arrives, at the end of its internal travel, at an almost vertical position before passing below the axle axis. For this, slide 6 associated with a roller 5 is in the shape of a blade whose inner surface, parallel to the axle axis, is at a distance from said axis that begins at a value equal to that of the distance of roller 5 at its outer stop and decreases steadily to a value equal to the permitted travel of movable element 18 as it rotates in the angular sector from the end located in front of axle 10 to its ultimate disengagement point 7 slightly in front of a perpendicular from the axle axis.

Advantageously, the angular sector occupied by the slide can begin at a point horizontally with the axle and in front of it and end at an angle equal to approximately half that separating two connecting means 8 before the vertical axis passing through the wheel axis. It is sufficient, however, for the slide to occupy a limited angular sector that ends before a vertical line below the axle. A "limited sector" is to be understood as a sector of less than $2\pi$ radians.

When the inner surface of slide 6 encounters roller 5 moving rotationally, it pushes it toward the axle axis and the roller brings along the rest of the movable assembly. Then, as the roller reaches disengagement point 7, it is abruptly released and the movable assembly can come back to a stop against running tread 1. This slide 6, associated with roller 5, thus constitutes a means for driving the movable assemblies, in an angular sector located between 90° and a small angle before the vertical axis below the axle, between their outer stop position against the running tread and a position close to the axle axis.

To ensure proper guidance of the movable assemblies along the radius of the wheel, along with better load distribution, said assembly will advantageously comprise at least two rods 4 distributed over the thickness of the wheel along the axis, with a spring 3 installed around each rod 4. Spring 3 can be installed between weight block 2 and inner ring 11, in which case it operates in compression. Said spring 3 can also be installed around each rod between inner ring 11 and roller 5, in which configuration the spring operates in extension.

Figure 2:
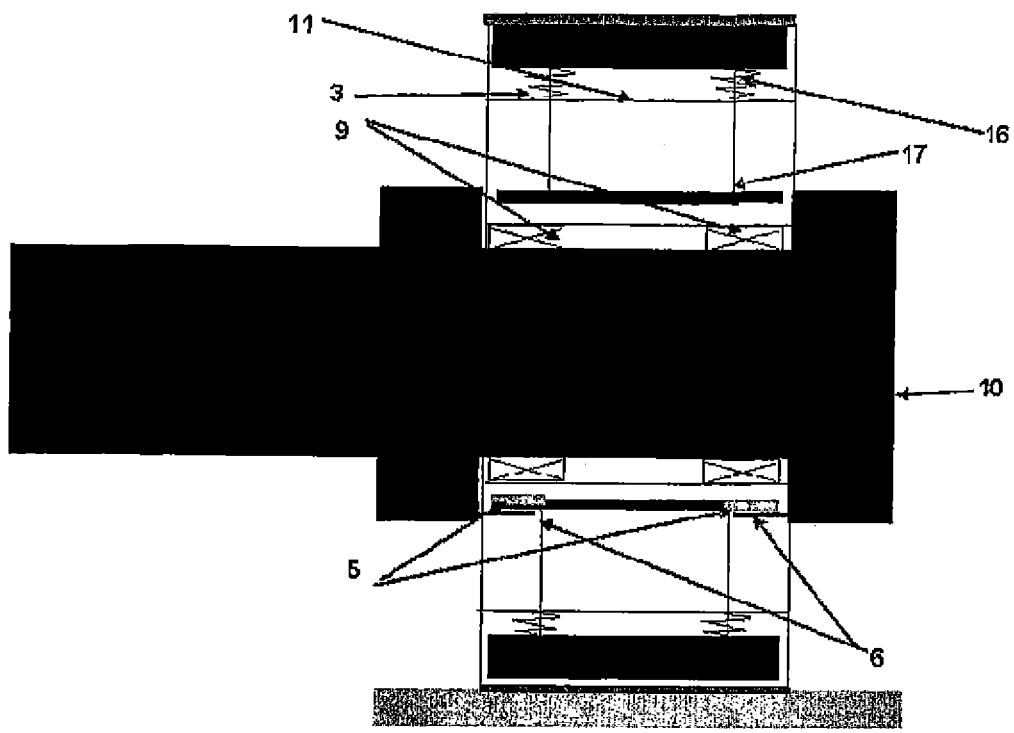
FIG. 2 is a detail of an arrangement of the fixed slide and the rollers, viewed along a radial section slightly in front of the axis, when the cam is still retaining the roller.

FIG. 2 shows a first arrangement of slides and rollers in which axle 10 comprises two disks on either side of the wheel which surround hub 9. Slide 6 is made up of two blades, the profile of which was described above, secured to the end of the disks of axle 10 toward the inside of the wheel with respect to its plane of symmetry perpendicular to the axis. Rollers 5 of the movable assembly are secured to end 17 of rods 4, on either side of a rigidity structure that causes ends 17 to be integral, toward the outside of each side of the wheel. The blades of slide 6 each come into contact with a roller 5.

Figure 3:
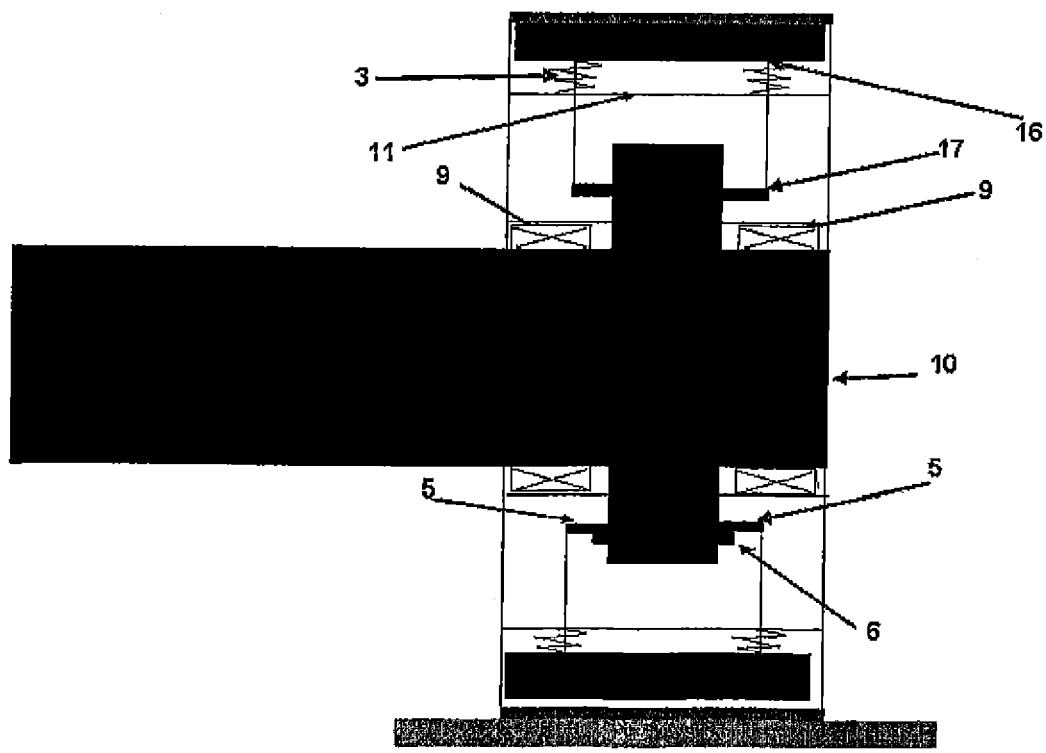
FIG. 3 is a detail of a second arrangement of the fixed slide and the rollers, viewed along a radial section slightly in front of the axis, when the cam is still retaining the roller.

FIG. 3 shows a second arrangement of cams and rollers in which axle 10 comprises a central disk surrounded by hub 9 of the wheel. Slide 6 is constituted by two blades, the profile of which was described above, secured on either side to the end of the disk of axle 10. Rollers 5 are turned toward the inside at end 17 of two rods 4, the spacing of which corresponds to the thickness between the two blades of cam 6.

Each roller 5 of a movable assembly comes into contact, at each revolution of the wheel, with the fixed slide 6. Slide 6 drives the roller, and the elastic system is compressed by the travel of the weight block. As the movable assembly moves into a vertical position, after release of the roller at disengagement point 7 of the slide, the relaxation of the elastic system propels weight block 2 onto the inner surface of running tread 1 at the location where it is in contact with the ground.

The initial position of slide 6 in front of the axle need not necessarily be horizontally in front of the axle axis. On the other hand, the location of disengagement point 7 prior to the vertical must be adapted to the geometry of the movable assemblies so that weight block 2 does in fact drop onto running tread 1 at the location where it touches the ground.

The weight blocks strike the inner part of the wheel running tread perpendicularly to the latter's contact line with the ground. The impacts produced on the ground are distributed over the contact area between the running tread and the ground. The running tread distributes the load resulting from impact on the ground. Successively during rotation, each weight block will produce an impact such that the profile of the load applied to the ground will exhibit a succession of maxima that can amount to several times what is applied by a passive wheel of the same weight, and can trigger mines at that moment.

As an example, a simple test was performed for a wheel having the following characteristics:

| | |
|---|---|
| wheel diameter: | 40 cm |
| number of weight/rod/spring/roller assemblies: | 12 |
| weight of wheel alone: | 80 kg |
| total mass of wheel and applied vertical load (portion of trailer supported by the wheel): | 200 kg |
| spring stiffness: | 30 kN/m |
| spring travel: | approx. 5 cm. |

The results indicated a factor of approximately 3 between the maximum load input into the ground with and without operating the device.

Using a lighter weight/rod/spring/roller device, or with a wheel weighing 50 kg, but with a total weight of wheel and supported vertical load still equal to 200 kg, this factor between the maximum load input into the ground with and without the device is 2.4.

Figure 4A:
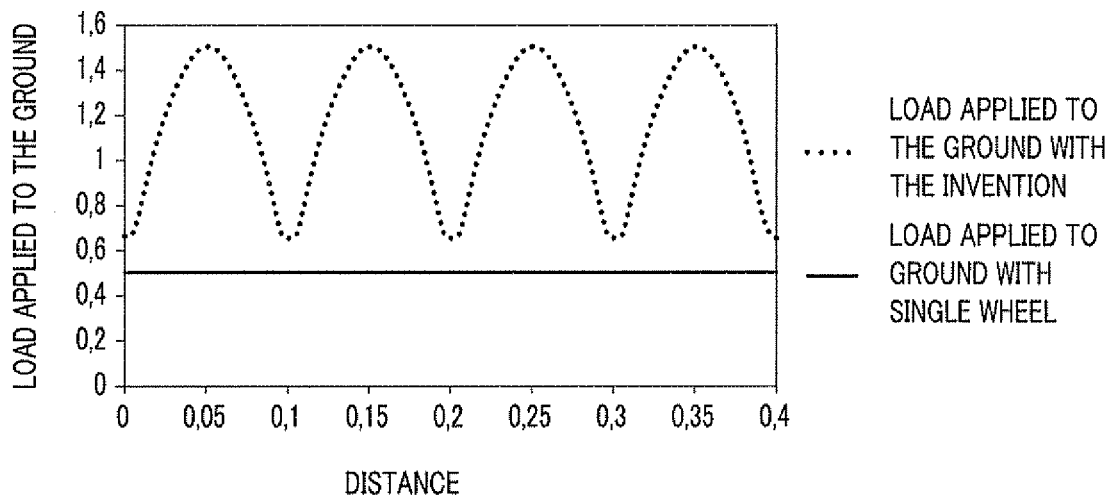
FIG. 4a presents a comparison between the loads applied to the ground by a wheel equipped with the device corresponding to the present invention, and the loads applied to the ground by a wheel of the same geometry and the same weight, as a function of distance over the ground.
Figure 4B:
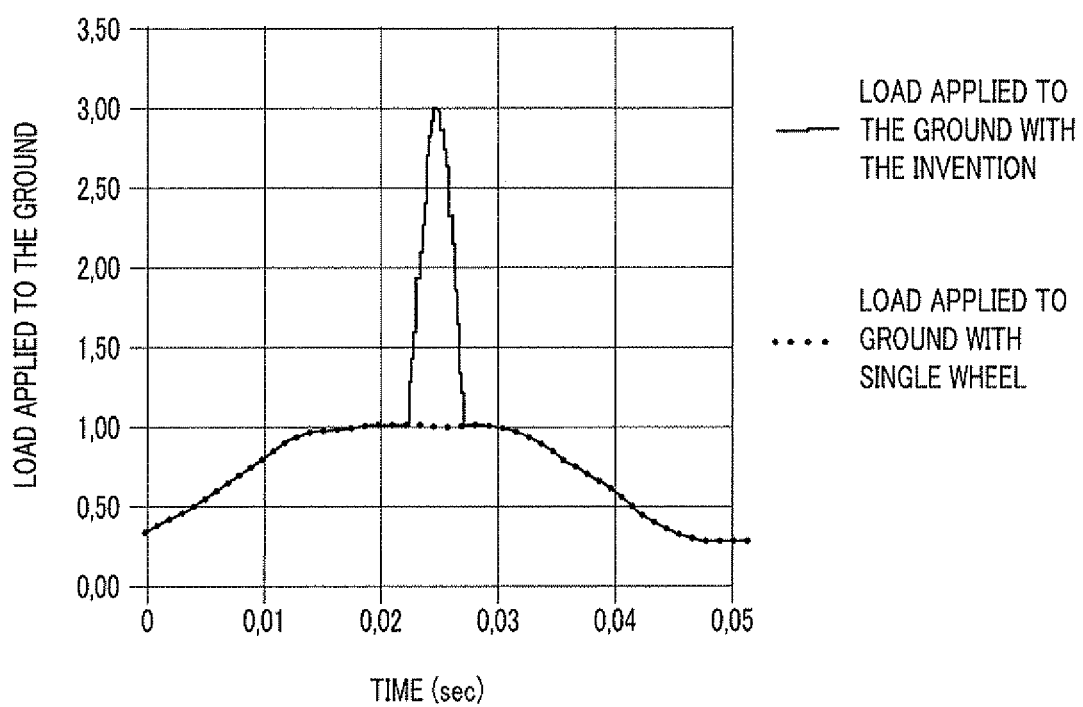
FIG. 4b presents a comparison between the loads applied to the ground by a wheel equipped with the device corresponding to the present invention, and the forces applied to the ground by a wheel of the same geometry and the same weight, as a function of time below the axle axis.

The two graphs in FIG. 4 show the difference in load obtained with and without the device:
- on the one hand, in the context of a fixed frame of reference (Eulerian frame of reference) at ground level, graph 4a depicts passage of the wheel over a given point to which a dynamic load is applied, as a function of speed;
- on the other hand, in the context of a movable frame of reference (Lagrangian frame of reference) connected to the center of the wheel, graph 4b depicts a profile of the dynamic loads applied by the wheel onto the ground.

In general, utilization of this new concept results in performance that varies chiefly as a function of the size and mass of the wheel and its ballast, as well as the characteristics of the springs and lastly the number thereof. The narrowness of the load peaks shows the importance of increasing the number of movable assemblies, and explains why the configuration proposed above comprises 32 assemblies, i.e. approximately three times as many as in the test presented.

The loads needed in order to store elastic energy before the impacts result in an increase in the wheel's resistance to forward motion. The invention thus converts a horizontal thrust exerted by the apparatus that is towing or pushing the wheel into dynamic vertical loads. The fact that the roller rolls on the cam during displacement minimizes frictional loads, and thus the horizontal thrust that must be exerted on the wheel.

An area of ground experiences less load between two successive impacts on the ground, as shown by the previous graph. To minimize this phenomenon by increasing the impact frequency, a second variant of the invention consists in doubling the number of weight blocks by placing two rings of movable assemblies side by side in staggered fashion, i.e. offset by an angle equal to half the angular sector occupied by one set of a weight block plus an elastic system.

Figure 5:
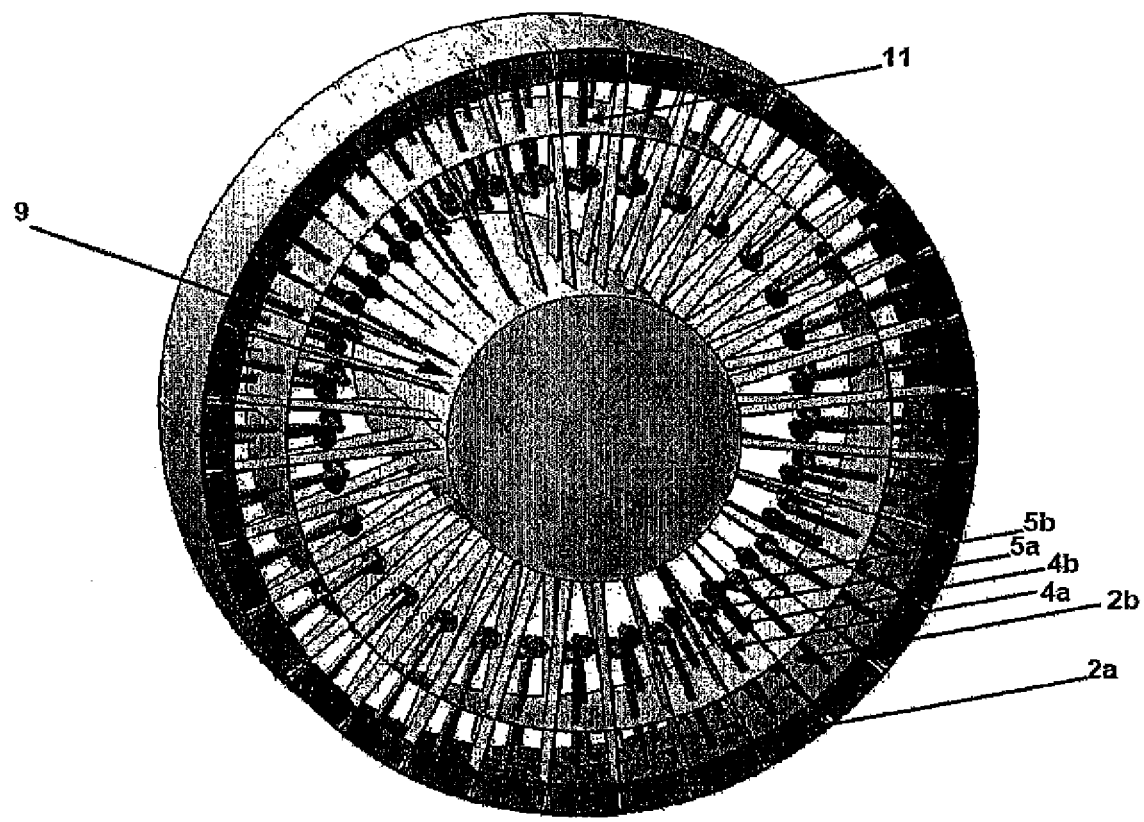
FIG. 5 is a perspective view of a variant of the first embodiment in which two weight block rings are arranged in staggered fashion.

FIG. 5 is a schematic diagram of this second variant having, for each movable assembly, a rod and a roller that can be driven by a single central cam for both rings. In FIG. 5, two rings of movable assemblies, juxtaposed in staggered fashion over the circumference, replace the initial ring. Weight block 2b of the ring in the background is offset by a distance equal to half the circular arc occupied by weight block 2a. The rod and roller assemblies (4a, 5a) and (4b, 5b) are thus also offset. Ring 11 on which the springs are braced is depicted, but springs 3, and central cam 6 that would be arranged between the two rows of rollers 5a and 5b (as in the second arrangement described for the variant having only one ring) is not depicted. In this case there is thus no need to modify the slide.

Since rollers 5a and 5b arrive in offset fashion at disengagement point 7 of the slide, the impact frequency is doubled.

This second variant having two rings can thus (although this is not depicted) be adapted to the instance in which two identical driving cams are arranged one either side of the wheel, as in the case having only a single ring. It is of course possible to envisage a further increase in the number of rings by successively offsetting them by a fraction corresponding to the angle occupied by one movable assembly, but this would require a change in the arrangement of the slides.

Figure 6A:
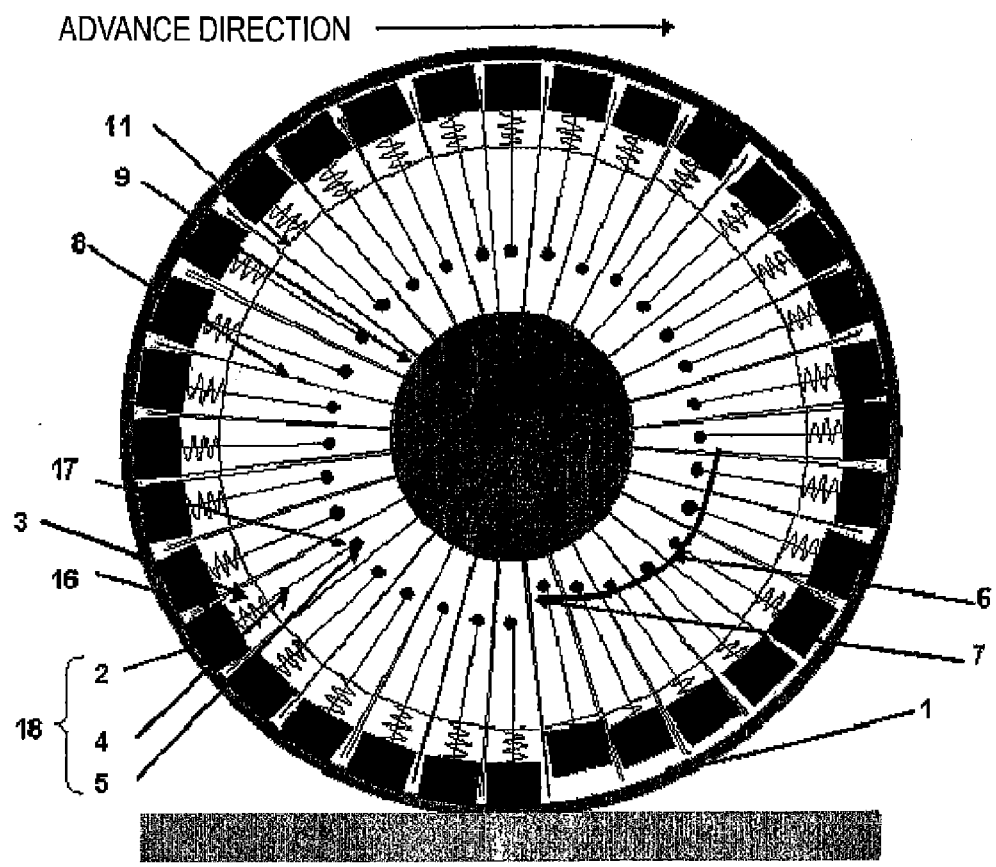
FIG. 6a is a view along the hub axis of a variant of the first embodiment, in which there is no rigid running tread and the weight blocks are in direct contact with the ground.
Figure 6B:
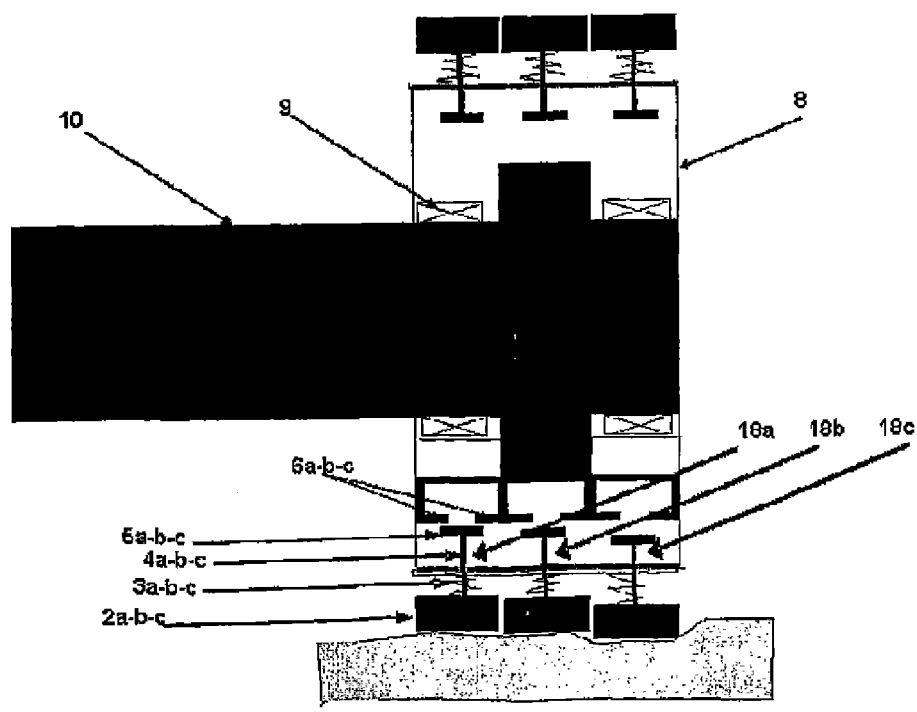
FIG. 6b is a radial sectioned view of a variant, having three juxtaposed rings of movable assemblies, of the first embodiment, in which there is no rigid running tread and the weight blocks are in direct contact with the ground.

A third variant, illustrated in FIGS. 6a and 6b, consists in reusing the same basic principle but this time creating the impact directly on the ground at each weight block 2. The wheel no longer comprises a solid outer ring forming a running tread, but instead has three identical rings of movable assemblies 18a, b, c with their elastic systems 3a, b, c juxtaposed along the axle axis, with no angular offset. The peripheral surfaces of weight blocks 2a, b, c what form a circular running tread when the movable assemblies are at the outer end of their travel.

If the ground surface is irregular, the fact that the travel of movable assemblies 18a, b, c is not blocked by a running tread allows the three weight blocks 2a, b, c of the movable assemblies that are passing vertically below the axle axis to be simultaneously in contact with the ground. This arrangement, with three weight blocks successively in contact with the ground, has the advantage of conforming better to the transverse profile of the ground when surfaces having ruts or gullies need to be cleared of mines, since the other variants and the conventional wheels and rollers have limitations on rough terrain.

In this third variant, the arrangement of slides 6a, b, c and rollers 5a, b, c is defined as follows (FIG. 6b): Each movable assembly 18a, b, c comprises a single rod 4a, b, c at the center with a roller 5a, b, c radially on each side. Axle 10 comprises a central disk surrounded by hub 9 of the wheel. At the end of this disk, three identical slides 6a, b, c, having two blades which enclose rollers 5a, b, c of each movable assembly, are fastened radially side by side.

A second embodiment that minimizes the number of movable systems consists in the fact that said movable assemblies remain in the vertical plane passing below the axle axis, independently of the movement of the wheel. In this case the means that is suitable for driving movable assembly 181, and is integral with axle 10, is a cam 61 that rotates with the wheel.

Figure 7:
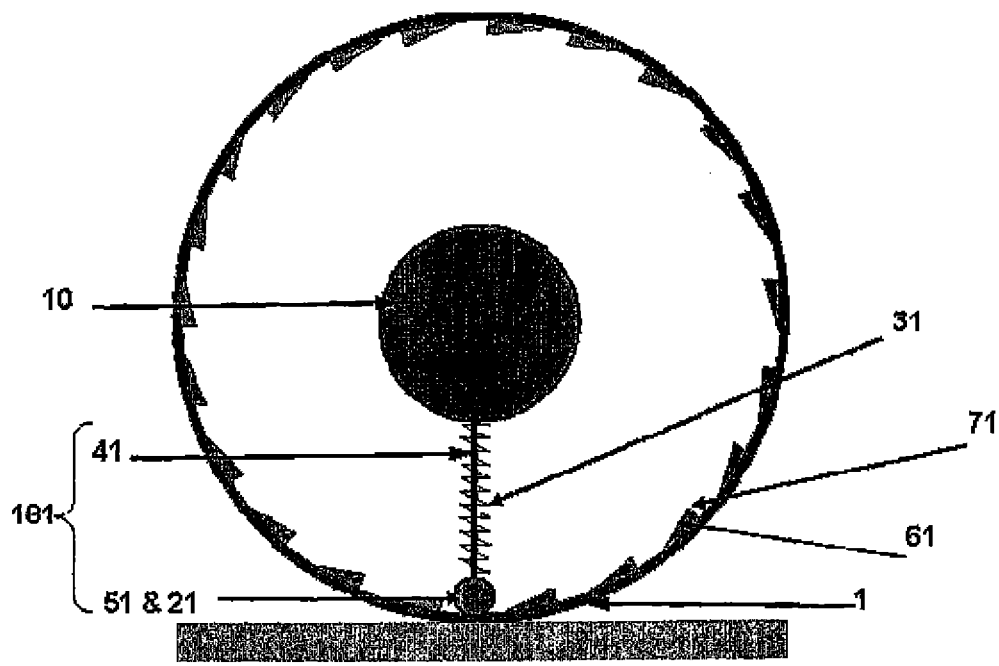
FIG. 7 is a view along the hub axis of the second embodiment of the invention, in which the movable assemblies are integral with the hub, are vertical, and are operated by cams fastened onto the running tread.

FIG. 7 is a view along the axle axis of this second embodiment. The movable assembly is constituted by a weight block 21 fastened to at least one rod 41 that extends to axle 10. Either the rod is free to translate and slides with respect to the axle with weight block 21 fastened to its end, or rod 41 is fixed with respect to axle 10 and weight block 21 can slide along rod 41. In both cases, the movable assembly will have a vertical travel that allows weight block 21 to be brought close to an outer stop corresponding to abutment of weight block 21 against the running tread. In general, the movable assembly must be vertically fixed as the device advances and the wheel rotates, by being integral with a structure that is fixed in the translation frame of reference of the device, connected to the axle (if it does not rotate) or to the carriage that it supports.

The elastic system is constituted by a spring braced between weight block 21 and axle 10 or the fixed structure supporting movable assembly 181.

Roller 51 that serves to operate movable assembly 181 will preferably also function as a weight block.

The geometry of cam 61 fastened onto the inner circumference of the running tread is periodic and sawtoothed, and reproduces a basic pattern in the shape of a wedge whose tip is oriented toward the rotation direction of the wheel, with a step 71 followed by a portion of the inner circumference of the running tread. The angular sector of the basic pattern is larger in size than that occupied by roller 51, in order to allow weight block 21 to come back into contact with the running tread, but is still comparable to it in size with respect to the circumference in order to optimize the number of dynamic impacts on the ground. The maximum thickness of cam 61 at the location of step 71 corresponds to the travel permitted for movable assembly 181.

As in the first embodiment, the number of basic cam profiles can be modified depending on the wheel dimensions and the correlation between the weight of weight block 21 and the travel of the movable assembly.

Sliding of the lower end of the movable assembly on the profiles of cam 61 during rotation of the wheel allows production of a succession of vertical impacts on running tread 1 at the location where it contacts the ground, thus producing the same effect as in the first embodiment. The tangential frictional load of the movable assembly on the cam will advantageously be minimized by the rolling of roller 51 and weight block 21.

Figure 8:
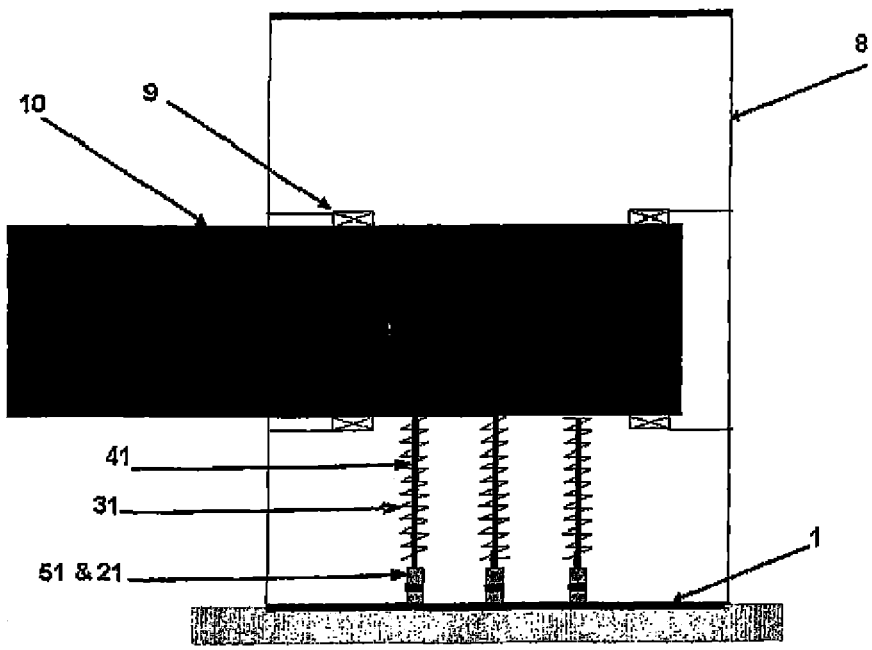
FIG. 8 is a radial sectioned view of a variant of the second embodiment of the invention, having three movable assemblies that are integral with the hub and are operated by cams fastened onto the running tread.

FIG. 8 is a vertical axial section of a second variant of the second embodiment, comprising multiple movable assemblies placed in parallel in the vertical plane in order to increase the number of impacts on the ground. Movable assemblies 181 with their elastic systems 31, distributed over the thickness of the wheel, are identical. On the other hand, a cam profile 61 is specifically adapted on the inner circumference of the running tread over which each movable assembly runs. Located on each circumference is a cam profile geometrically identical to the one that would be used for the case having only one movable assembly, as described above. From one circumference to another, however, each cam is offset with respect to the preceding one by a fraction of the basic angular sector inversely proportional to the number of movable assemblies. The impacts of the weight blocks are thereby offset in time within the transition period over one basic cam pattern.

These different types of wheel could advantageously be integrated into a trailer whose function would be mine clearing by decoying pressure mines.

The invention claimed is:

1. A device for triggering mines by pressure, comprising an axle and at least one wheel having a central hub and rotating about the axle, the device for triggering mines comprising at least one assembly, each assembly having a rod oriented along a radius of the wheel and rotating with the wheel, a weight block movable along the rod, an elastic system which urges the weight block to the radial end of the rod, and means for driving the weight block along the rod, the means for driving the weight block along the rod being fixed with respect to the axle, and driving the weight block toward the central hub steadily up to an ultimate point corresponding to the position where the rod is almost vertical and the weight block is below the axle, so that the elastic system urges the weight block toward the radial end of the rod in the position where the rod is vertical or almost vertical.

2. The device according to claim 1, wherein the elastic system comprise at least one spring.

3. The device according to claim 1, wherein the means for driving the weight block along the rod in the direction of the hub is at least one blade, whose inner surface is turned toward the hub and contacts a contact element of the least one assembly, the at least one blade being fixed with respect to the axle and located at the front lower half of the wheel with respect to the advance direction of the wheel, the distance of the blade from the hub decreasing steadily from a first end of the blade to a second end of the blade closest to a vertical plane containing the axle axis.

4. The device according to claim 3, wherein said contact element is a roller.

5. The device according to claim 4, wherein the roller is at the central hub end of the rod.

6. The device according to claim 1, wherein the device comprises at least one series of identical assemblies forming a complete ring that rotates with the wheel; and the means for driving the weight blocks of each assembly is common for all assemblies, being a slide whose inner surface is fixed with respect to the axle and located at the front lower half of the wheel with respect to the advance direction of the wheel, the distance of the inner surface from the hub decreasing steadily from a first end of the inner surface to a second end of the inner surface closest to a vertical plane containing the axle axis.

7. The device according to claim 6, wherein the device comprises a number of series of identical assemblies, each series of identical assemblies forming a complete ring that rotates with the wheel, the number of rings being juxtaposed side by side in a staggered fashion in the axis of the wheel and the rings being successively offset by an angle equal to the angle of the angular sector occupied by one assembly in one ring divided by the number of rings.

8. The device according to claim 6, wherein the device comprises a number of series of identical assemblies, each series of identical assemblies forming a complete ring that rotates with the wheel, the number of rings being juxtaposed side by side in a non-staggered fashion in the axis of the wheel.

9. The device according to claim 8, wherein the peripheral surfaces of the weight block form the running tread of the wheel.

10. The device according to claim 6, wherein the wheel comprises an external ring constituting a running tread, regularly distributed radii connecting the hub and the running tread, a second ring in the form of a circular strip closer to running tread than to the hub and integral with the regularly distributed radii, each angular sector of the wheel encompassed with two successive regularly distributed radii containing an assembly comprising a weight block connected to at least one rod oriented along the radius of the wheel along which the assembly translates, each rod being connected at its peripheral end to the weight block, and at its inner end to a roller that is free to rotate on the slide in accordance with an axis perpendicular to the rod 4, each rod being free to translate along the radius, and passing through a bore formed in the second ring, the weight block moving along the rod to which is fastened, between a peripheral stop position in which the weight block touches the interior of running tread and a position close to second ring, the length of the rod being such that that its inner end is not in contact with the hub when the weight block is at the end of its travel toward inner ring, the elastic system of the assembly being arranged between the weight block and the second ring.

11. The device according to claim 1, wherein the travel of each assembly toward the periphery of the wheel is limited by a running tread that transmits loads to the ground.

12. The device according to claim 1, wherein each assembly ensures contact between the device and the ground.

* * * * *